(12) United States Patent
Bono et al.

(10) Patent No.: US 9,329,803 B1
(45) Date of Patent: May 3, 2016

(54) FILE SYSTEM OVER THINLY PROVISIONED VOLUME FILE IN MAPPED MODE

(71) Applicant: EMC Corporation, Hopkinton, MA (US)

(72) Inventors: Jean-Pierre Bono, Westborough, MA (US); William C. Davenport, Burlington, MA (US); Miles A. de Forest, Bahama, NC (US); Walter C. Forrester, Berkeley Heights, NJ (US); Michal Marko, Fanwood, NJ (US); Ye Zhang, Shanghai (CN); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 291 days.

(21) Appl. No.: 13/931,769

(22) Filed: Jun. 28, 2013

(51) Int. Cl.
*G06F 3/00* (2006.01)
*G06F 3/06* (2006.01)

(52) U.S. Cl.
CPC ............ *G06F 3/0688* (2013.01); *G06F 3/0608* (2013.01); *G06F 3/0641* (2013.01)

(58) Field of Classification Search
None
See application file for complete search history.

(56) References Cited

U.S. PATENT DOCUMENTS

| | | | |
|---|---|---|---|
| 4,794,519 A | 12/1988 | Koizumi et al. | |
| 4,835,734 A * | 5/1989 | Kodaira et al. | 711/209 |
| 5,561,799 A | 10/1996 | Khalidi et al. | |
| 5,764,972 A | 6/1998 | Crouse et al. | |
| 5,870,734 A | 2/1999 | Kao | |
| 6,697,846 B1 | 2/2004 | Soltis | |
| 6,829,617 B2 | 12/2004 | Sawdon et al. | |
| 6,892,211 B2 | 5/2005 | Hitz et al. | |
| 7,010,553 B2 | 3/2006 | Chen et al. | |
| 7,043,485 B2 | 5/2006 | Manley et al. | |
| 7,107,385 B2 | 9/2006 | Rajan et al. | |
| 7,191,225 B1 | 3/2007 | Borthakur | |
| 7,197,490 B1 | 3/2007 | English | |
| 7,225,204 B2 | 5/2007 | Manley et al. | |
| 7,321,909 B1 * | 1/2008 | Garthwaite | |
| 7,325,110 B2 | 1/2008 | Kubo et al. | |
| 7,631,155 B1 | 12/2009 | Bono et al. | |
| 7,694,191 B1 | 4/2010 | Bono et al. | |
| 7,769,794 B2 | 8/2010 | Moore et al. | |

(Continued)

OTHER PUBLICATIONS

Muniswamy-Reddy, Kiran-Kumar, et al., "A Versatile and User-Oriented Versioning File System", FAST 2004. vol. 4, USENIX Ass'n, Berkeley, CA, 2004, pp. 115-128.

(Continued)

*Primary Examiner* — Kevin Verbrugge
*Assistant Examiner* — Craig Goldschmidt
(74) *Attorney, Agent, or Firm* — BainwoodHuang

(57) ABSTRACT

A data storage system includes storage devices and a processing subsystem executing software forming a lower-deck file system and an upper-deck file system. The lower-deck file system presents a volume file from which storage is provided to the upper-deck file system, and units of storage of the storage devices are allocable to the upper-deck file system but are not reserved to it. The volume file is thinly provisioned, and additional units of storage are added dynamically to increase its allocated size in response to demand from the upper-deck file system. The lower-deck file system operates in a mapped mode in which a block address in the lower-deck file system is obtained by a generally arbitrary mapping (e.g., an Inode/IB tree) of a block address in the volume file.

22 Claims, 7 Drawing Sheets

(56) References Cited

U.S. PATENT DOCUMENTS

| | | | |
|---|---|---|---|
| 7,818,535 B1* | 10/2010 | Bono et al. | 711/173 |
| 7,945,726 B2 | 5/2011 | Faibish et al. | |
| 8,037,345 B1 | 10/2011 | Iyer et al. | |
| 8,285,758 B1 | 10/2012 | Bono et al. | |
| 8,407,265 B1 | 3/2013 | Scheer et al. | |
| 8,407,445 B1 | 3/2013 | Pathak et al. | |
| 8,443,163 B1 | 5/2013 | Bailey et al. | |
| 2004/0030822 A1 | 2/2004 | Rajan et al. | |
| 2007/0136548 A1* | 6/2007 | Mane | 711/170 |
| 2007/0168678 A1* | 7/2007 | Meenakshisundaram | 713/189 |
| 2007/0260830 A1 | 11/2007 | Faibish et al. | |
| 2008/0005468 A1 | 1/2008 | Faibish et al. | |
| 2008/0050089 A1 | 2/2008 | Maeda | |
| 2009/0164536 A1 | 6/2009 | Nasre et al. | |
| 2009/0182789 A1* | 7/2009 | Sandorfi et al. | 707/204 |
| 2009/0327798 A1 | 12/2009 | D'Amato et al. | |
| 2010/0179941 A1 | 7/2010 | Agrawal et al. | |
| 2011/0022566 A1 | 1/2011 | Beaverson et al. | |
| 2011/0179082 A1 | 7/2011 | Vaghani et al. | |
| 2012/0011176 A1 | 1/2012 | Aizman | |
| 2012/0016840 A1 | 1/2012 | Lin et al. | |
| 2012/0131303 A1 | 5/2012 | Goebel et al. | |
| 2012/0191929 A1* | 7/2012 | Zietzke et al. | 711/162 |
| 2012/0303685 A1 | 11/2012 | Ulrich et al. | |
| 2013/0046740 A1 | 2/2013 | Li et al. | |
| 2013/0086324 A1 | 4/2013 | Soundararajan et al. | |
| 2013/0339569 A1 | 12/2013 | Yochai et al. | |
| 2014/0095582 A1 | 4/2014 | Eshel et al. | |
| 2014/0281151 A1 | 9/2014 | Yu et al. | |

OTHER PUBLICATIONS

Weinhold, Carsten, et al., "VPFS: Building a Virtual Private File System with a Small Trusted Computing Base", EuroSys '08, Glasgow, Scotland, UK, Apr. 1-4, 2008, pp. 81-93.

Xie, Guangjun et al., "ESnap—A Cached Dependent Snapshot System", Proc. of the 2007 IEEE International Conf. on Integration Technology, Shenzhen, China, Mar. 20-24, 2007, pp. 783-788.

Zadok, Erez et al., "A Stackable File System Interface for Linux", LinuxExpo Conference Proceedings, vol. 94, copyright 1999, 10 pages.

Zadok, Erez, et al., "On Incremental File System Development", ACM Transactions on Storage, vol. 2. No. 2., May 2006, pp. 161-196.

* cited by examiner

FILE SYSTEM OVER THINLY PROVISIONED VOLUME FILE IN MAPPED MODE

BACKGROUND

File-based data storage systems are known in the art. These systems include programming and hardware structures to provide file-based access to file systems. File-based data storage systems are sometimes referred to as Network Attached Storage or NAS systems. Such systems may support NFS (Network File System), CIFS (Common Internet File System), SMB (Server Message Block), and/or other file-based protocols. With file-based protocols, host computers (hosts) perform read and write operations to files by specifying particular file systems, paths, and file names. Internally to the data storage system, file system directories map the files specified by host commands to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

SUMMARY

Methods and apparatus are disclosed for a file-based data storage system that employs a certain set of functional components to provide flexibility and enhanced performance in providing file services to file system consumers such as hosts employing file-based protocols.

In one aspect, a data storage system is disclosed that includes physical nonvolatile storage devices such as disk drives, Flash memory arrays, etc., and a processing subsystem executing software forming a multi-level stack of functional components including a lower-deck file system and an upper-deck file system. The upper-deck file system provides a file system interface to the file system consumer. The lower-deck file system presents a volume file from which storage is provided to the upper-deck file system, and units of storage of the storage devices are allocable to the upper-deck file system as well as to other uses in the data storage system (i.e., not reserved to the upper-deck file system). The volume file is thinly provisioned so that its allocated size at any given time is generally less than its configured size, and additional units of storage are added dynamically to the volume file to increase its allocated size in response to demand from the upper-deck file system. The lower-deck file system operates in a mapped mode in which a block address of a data block in the lower-deck file system is obtained by a generally arbitrary mapping (e.g., an Inode/IB tree) of a corresponding block address of a data block in the volume file.

The use of the lower-deck file system in mapped mode provides performance and flexibility advantages, such as the thin provisioning of the volume file consumed by the upper-deck file system and an ability to provide other functionality. For example, the structure may be used to support data deduplication in a domain potentially including many file systems. In one embodiment, the lower-deck file system may include an ability to transition to a direct mode of operation, providing additional flexibility in system deployment and use.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

Figure 1:
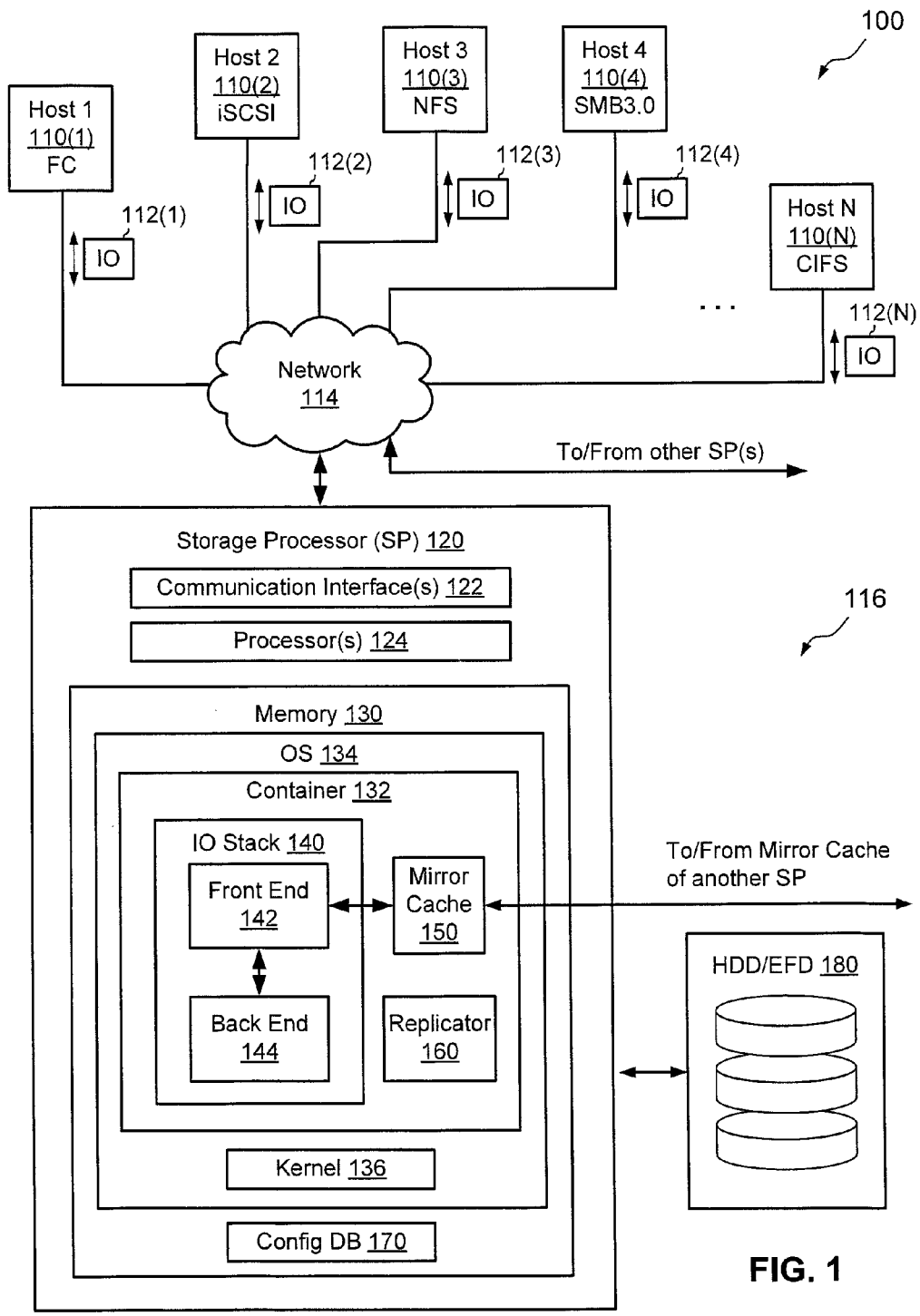
FIG. 1 is a block diagram showing a data storage apparatus in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage apparatus 116 over a network 114. The data storage apparatus 116 includes a storage processor, or "SP," 120 and storage 180. The storage 180 is provided, for example, in the form of hard disk drives (HDD) and/or electronic flash drives (EFD). Although not shown in FIG. 1, the data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)) and includes a front end 142 and a back end 144. The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage apparatus 116, such as on a disk drive separate from the SP 120 but accessible to the SP 120, e.g., over a backplane or network.

In operation, the hosts 110(1-N) issue IO requests 112(1-N) to the data storage apparatus 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include caching data provided with any write IO requests to the mirror cache 150, which may in turn cache the data to another SP. Also within the front end 142, mapping operations map LUNs and host file systems to underlying files stored in a set of internal file systems of the front end 142. Host IO requests received for reading and writing both LUNs and file systems are thus converted to reads and writes of respective files. The IO requests then propagate to the back end 144, where commands are executed for reading and/or writing the physical storage 180, agnostically to whether the data read and/or written is directed to a LUN or to a host file system.

Although FIG. 1 shows the front end 142 and the back end 144 together in an "integrated" form, the front end 142 and back end 144 may alternatively be provided on separate SPs. For example, the IO stack 140 may be implemented in a "modular" arrangement, with the front end 142 on one SP and the back end 144 on another SP. The IO stack 140 may further be implemented in a "gateway" arrangement, with multiple SPs running respective front ends 142 and with a back end provided within a separate storage array. The back end 144 performs processing that is similar to processing natively included in many block-based storage arrays. Multiple front ends 142 can thus connect to such arrays without the need for providing separate back ends.

Figure 2:
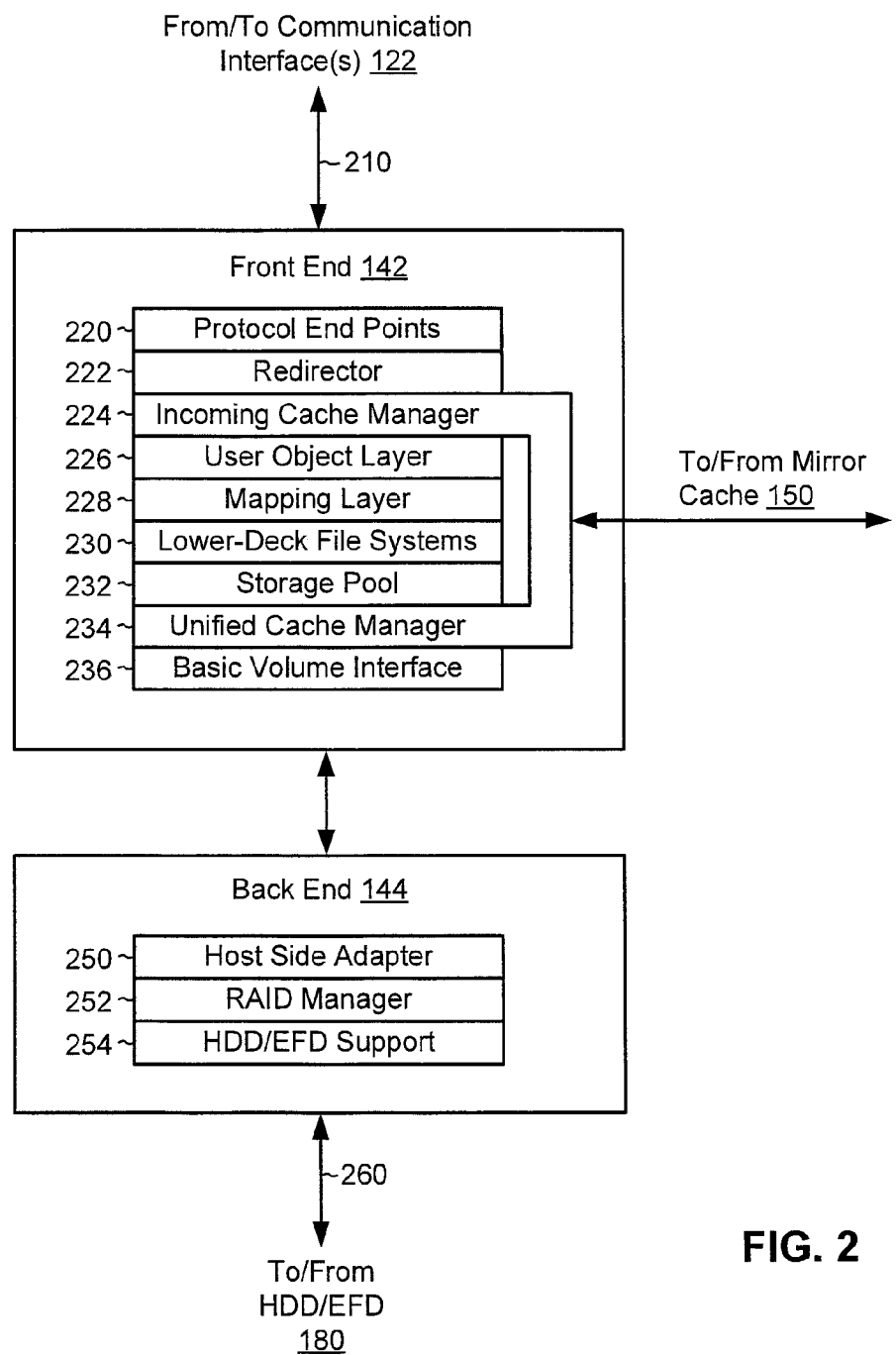
FIG. 2 is a block diagram showing particular example features of a storage processor of FIG. 1, including features of a front end and a back end of an IO stack.

FIG. 2 shows the front end 142 and back end 144 of the IO stack 140 in additional detail. Here, the front end 142 is seen to include protocol end points 220, a redirector 222, an incoming cache manager 224, a user object layer 226, a mapping layer 228, one or more lower-deck (internal) file systems 230, a storage pool 232, a unified cache manager 234, and a basic volume interface 236. The back end 144 is seen to include a host side adapter 250, a RAID (Redundant Array of Independent Disks) manager 252, and hard disk drive/electronic flash drive support 254.

Within the front end 142, protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage apparatus 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. The redirector 222 performs no operation for file-based host IO requests. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage apparatus, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host JO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN or file system being written to), but such destaging may be conducted when convenient and out of band with the processing of host IOs. Processing continues to the incoming user object layer 226.

The user object layer 226 presents underlying files representing LUNs and underlying files representing host file systems in a form recognized by the hosts (i.e., as LUNs and host file systems). For example, the user object layer 226 presents data stored in underlying files for block-based data as LUNs. The user object layer 226 also presents data stored in underlying files for file-based data as host file systems. In an example, the user object layer 226 includes an upper-deck file system for each host file system stored in a file of the lower-deck file system(s) 230 (described below). Each upper-deck file system presents files and directories of a host file system to the hosts 110(1-N), even though the host file system is represented internally as a file.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host JO request are thus mapped to a set of blocks in the underlying file that represents the LUN. Similarly, for host file systems, the mapping layer 228 converts a given file or directory represented in an upper-deck file system of the user object layer 226 to a particular file in a lower-deck file system 230 and to a particular location within the file.

The lower-deck file system layer 230 represents LUNs and host file systems in the form of files. Any number of lower-deck file systems 230 may be provided. In one arrangement, a single lower-deck file system 230 may be provided to include any number of LUNs and/or host file systems, as well as their snaps (i.e., point-in-time copies). In another arrangement, a different lower-deck file system is provided for each primary object to be stored, i.e., for each LUN and for each host file system. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The basic volume interface 236 is arranged to send host IOs to the back end 144 when the back end 144 is provided on another SP of the data storage apparatus 116 or when the back end 144 is provided on a separate array. In an example, the basic volume interface 236 converts host IOs propagating out of the front end 142 to a block-based protocol, such as Fibre Channel. After being processed by the basic volume interface 236, processing continues to the back end 144.

Within the back end 144, the host side adapter 250 receives the host IO and extracts the host IO content. In some implementations, such as the "integrated" arrangement shown in FIG. 1, the basic volume interface 236 and host side adapter 250 may be omitted or may be made to perform no operation.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
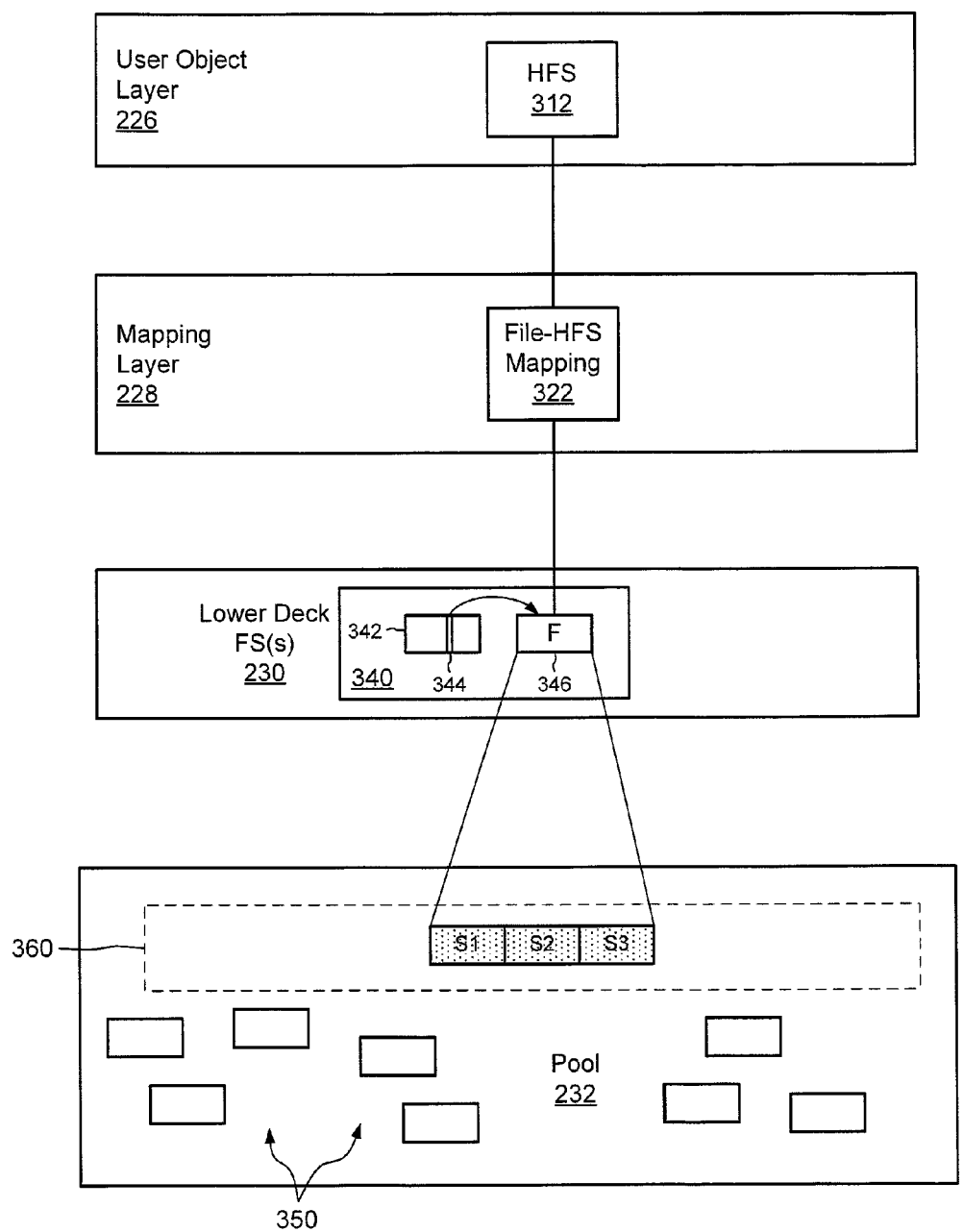
FIG. 3 is a block diagram showing example features of the front end of FIG. 2 in additional detail, including lower-deck file systems built upon storage units (e.g., slices) from a storage pool.

FIG. 3 shows portions of the front end 142 in additional detail. Here, the user object layer 226 includes a representation of an HFS (host file system) 312, and the mapping layer 228 includes a file-to-HFS mapping 322. The file-to-HFS mapping 322 maps the HFS 312 to a file F (346). Through the file-to-HFS mapping 322, any file or directory of the HFS 312 is mapped to a corresponding set of blocks within the file 346.

The file 346 is included within a particular lower-deck file system 340. The lower-deck file system 340 includes an inode table 342. The inode table 342 provides information about files in the lower-deck file system 340 in the form of inodes. For example, the inode table 342 of the lower-deck file system 340 includes an inode 344 which provides file-specific information about the file 346. The information stored in each inode includes location information (e.g., data block locations) where the data of the respective file is stored, and may thus be accessed as metadata to identify the locations of the file 346.

Although a single file is shown for the lower-deck file system 340, it is understood that each of the lower-deck file systems 230 may include any number of files, each having its own entry in the respective inode table of its file system. Also, a lower-deck file system may store not only regular files such as the file F 346, but also snapshots (point-in-time copies, also called "snaps") of such files. In this context the original file (e.g., file F 346) is referred to as a "primary" file. For instance, the lower-deck file system 340 stores the primary file 346 along with a different file for every snap of that file (such snaps effectively forming snaps of the HFS 312).

As shown, a set of slices 360 is allocated from the storage pool 232 for storing the file 346. In the example shown, slices S1 through S3 are used for storing the file 346, and thus the data that make up the HFS 312 are stored in the slices S1 through S3. In an example, the storage pool 232 allocates slices 350 to the set of file systems 230 in an on-demand manner, e.g., as the file 246 requires additional storage. The storage pool 232 can also deallocate slices from the set of file systems 230 when all the currently allocated slices are no longer required.

As described more below, at least some of the lower-deck file systems 230 are associated with respective volumes referred to as "sparse volumes". Sparse volumes provide an additional layer of mapping between the lower-deck file systems 230 and the pool 232 and allow the lower-deck file systems 230 to operate as file systems normally do, by accessing underlying volumes. Sparse volumes may also be employed at a higher level, between an HFS 312 and a file of a lower-deck file system 230 that is presented as a volume. Additional details about sparse volumes and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4:
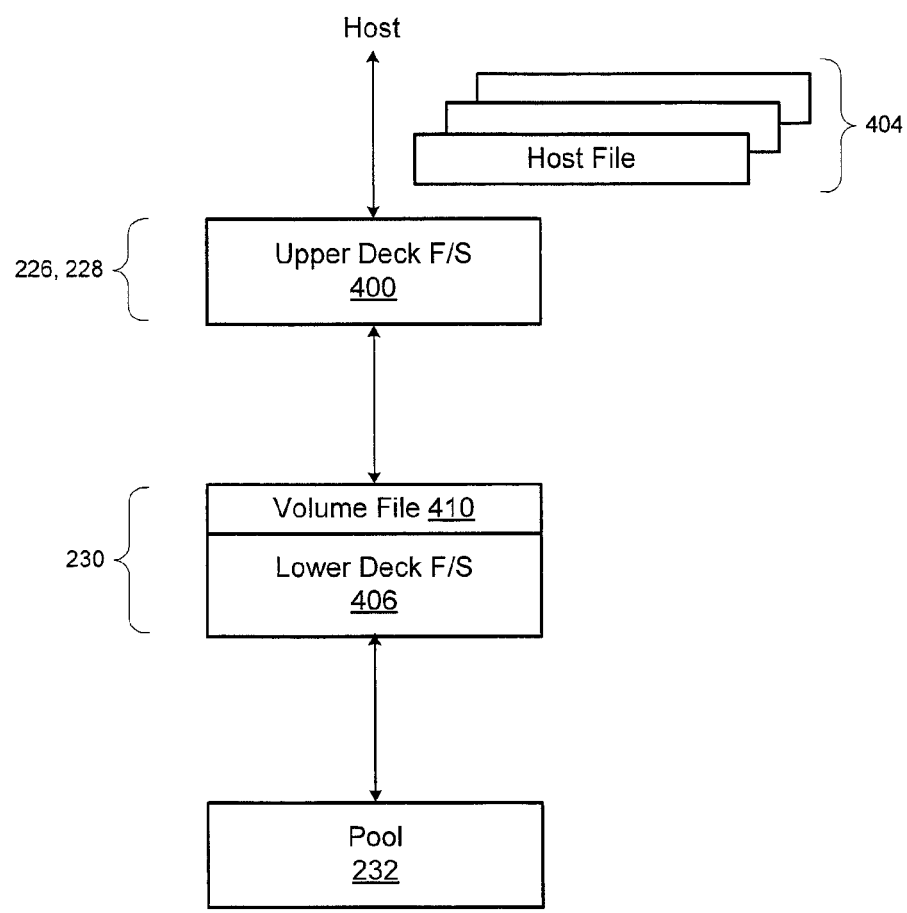
FIG. 4 is a block diagram showing file systems of the IO stack.

FIG. 4 shows another view of the organization of the data storage system useful for describing certain functionality as presented below. In FIG. 4, the user object and mapping layers 226, 228 include an upper-deck file system 400. As shown, the upper-deck file system 400 presents data in the form of host files 404 to a separate host computer (not shown). The lower-deck file system layer 230 includes a lower-deck file system 406. The lower-deck file system 406 presents a file referred to as a "volume file" 410 to the upper-deck file system 400.

As described more below, the arrangement of FIG. 4 uses so-called "thin provisioning", which refers to the manner in which slices of the pool 232 become allocated or assigned to the upper-deck file system 400 as underlying physical storage for file contents. In the present description, "thin provisioning" includes the following features:

1. Underlying storage is not fully reserved, meaning that the configured size of the upper-deck file system 400 is greater than the amount of storage in the pool 232 reserved for use by the upper-deck file system 400 to the exclusion of other potential users (e.g., other file systems 230).

2. Underlying storage is dynamically allocated, meaning that slices from the pool 232 are assigned for actual use by the upper-deck file system 400 as its contents grow in response to the writing of data.

3. The volume file 410 is sparse, i.e., only incompletely containing actual underlying storage. Slices that are cut from the volume file 410 for use by the upper-deck file system 400 are actually thinly provisioned, and corresponding storage is allocated from the lower-deck file system 406 only when the volume file 410 is effectively written into by the upper-deck file system 400. Said differently, a slice may have been provisioned into the upper deck file system 400 and yet have no storage associated to it from the lower-deck file system 406.

Figure 5:
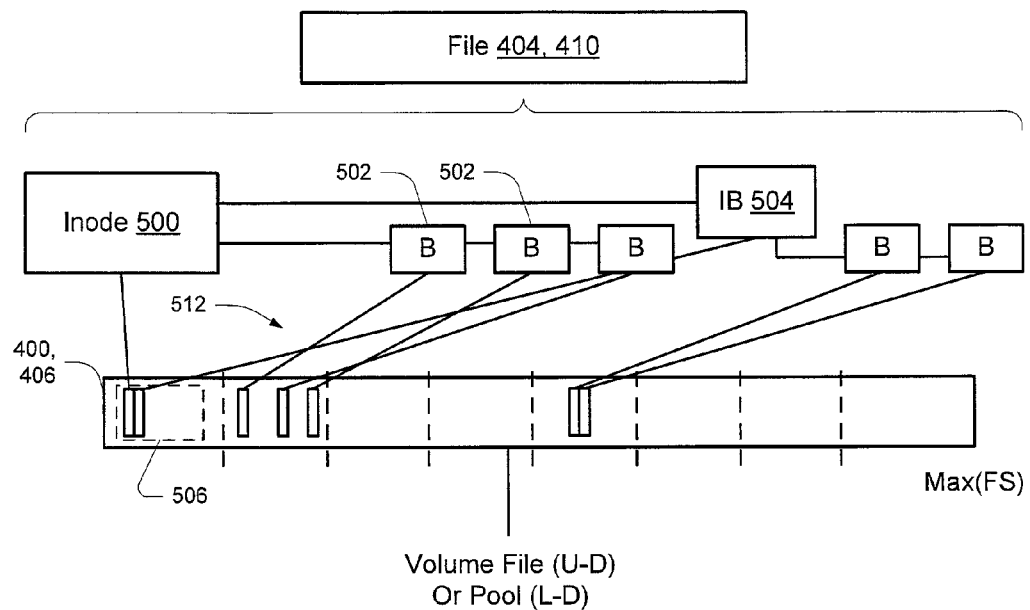
FIG. 5 is a schematic diagram of operation of a file system.

FIG. 5 illustrates certain details regarding files and file systems, applicable at both the upper layer (404, 400 in FIG. 4) and at the lower layer (410, 406) except for certain differences that are noted below. A file 404, 410 is shown as including an Inode 500 and a set of data blocks (B) 502. An indirect block (IB) 504 is also shown. All these items are included in the respective file system 400, 406, which in general will contain multiple files. Thus, the Inode 500 is part of an Inode structure 506 that includes Inodes of other files (not shown) as well as the indirect blocks 504. Additional details about the files 404, 410 and file systems 400, 406 are provided below.

Also shown in FIG. 5 is the relationship of the file 404, 410 to the respective file system. Each file system 400, 406 has a respective maximum size (as may be specified in blocks or bytes, for example) shown as Max(FS). At any given time there is an allocated size corresponding to the amount of underlying storage that is actually allocated for use.

The upper-deck file system 400 draws slices of storage from the volume file 410, while the lower-deck file system 406 draws slices directly from the pool 232. Of course, the volume file 410 is constituted by slices from the pool 232 via operation of the lower-deck file system 406. In many cases it will be desirable that slices defined at the upper level (upper-deck file system 400 and volume file 410) are of the same size, and aligned with, slices as defined in the pool 232 and used by the lower-deck file system 406. However, in general this is not required.

Returning to the files 404, 410, the Inode 500 contains direct pointers to some number of blocks 502 where file data is stored. If the file is sufficiently large, then one or more indirect blocks 504 are used. The Inode 500 contains pointers to the indirect block(s) 504, which in turn include pointers to additional data blocks 502. In typical file systems there may be at most three levels of indirection. In the description below, the term "IB tree" is used to refer to the entire set of IBs 504 and the Inode 500 for a given file.

FIG. 5 shows what is referred to as a "mapped" mode of operation of a file system 400, 406, in which a logical linear arrangement of blocks 502 viewed as a linear file are mapped to generally arbitrary locations as viewed in the address space of the file system 400, 406. For the upper-deck file system 400, mapped operation is essentially inherent, and there is no other mode. For the lower-deck file system 406, however, mapped mode is one of potentially multiple distinct operating modes, possible due to the internal nature and specialized use of the lower-deck file system 406 in the data storage system. The remaining description focuses on mapped mode operation of the lower-deck file system 406 in particular.

In FIG. 5 the mapping is indicated by generally crossing lines 512 extending between the blocks 502 of a volume file 410 and their locations in the lower-deck file system 406. In mapped mode, the lower-deck file system 406 assigns blocks 502 to regions of its address space in a generally arbitrary manner, at least among groups of blocks 502 that are stored at different times. That is, blocks 502 are assigned to areas of physical storage as the blocks 502 are initially written, and in general a group of blocks 502 being written together will occupy sequential block areas. However, the blocks 502 of one file are generally interspersed with those of other files, and as files grow new areas of physical storage are allocated that are generally not contiguous with or ordered relative to existing areas where blocks 502 of the file are already stored.

With respect to the lower-deck file system 406 in particular, mapped mode operation implies a generally arbitrary relationship between blocks of the volume file 410 presented to the upper-deck file system 400 and the blocks as stored in the lower-deck file system 406. To satisfy an I/O request directed to a given block of the volume file 410 generally requires that the lower-deck file system 406 examine (or "traverse") the inode 500 and IB(s) 504 to identify the location of the block within the lower-deck file system 406. This represents a performance penalty, albeit one that is normally deemed acceptable when thin provisioning is used. The tradeoff is one of I/O latency and throughput versus storage efficiency, i.e., efficient use of available physical storage from the pool 232. As described below, in some embodiments a technique may be employed for transitioning a file system to a direct operating mode in which predetermined calculations can be used instead of Inode/IB traversals.

It should also be noted that mapped mode of operation of the lower-deck file system 406 may include deduplication functionality by which duplicate blocks in a deduplication domain including the upper-deck file system 400 are stored as a single shared block and size.

Figure 6:
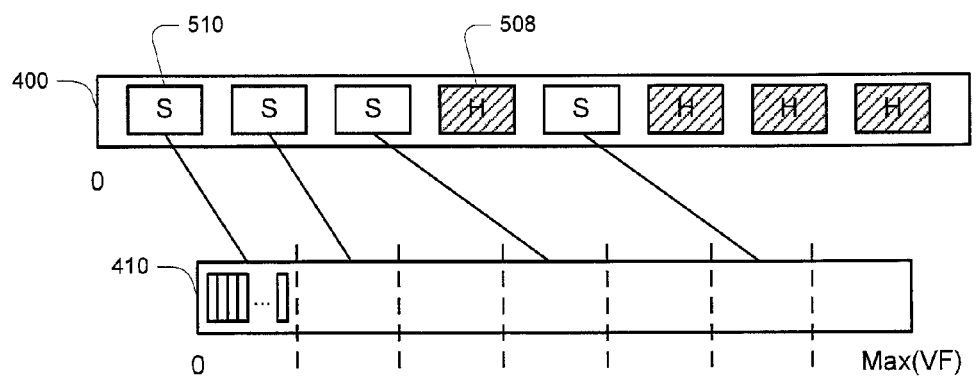
FIG. 6 is a schematic diagram of use of a volume file for storing data of a file system.

FIG. 6 illustrates the relationship between the upper-deck file system 400 and the volume file 410 presented by the lower-deck file system 406. Slices 510 are created from corresponding slice-size areas of the volume file 410, with a generally arbitrary mapping between their respective locations. Holes 508 are slice-size areas not currently provisioned. As the actual size of the upper-deck file system 400 increases, which is reflected in holes 508 being replaced with slices 510, the size of the volume file 410 is increased accordingly. This demand from the upper-deck file system 400 is passed down to the lower-deck file system 406, to which additional pool slices 350 are allocated to enable the lower-deck file system 406 to grow the size of the volume file 410 accordingly, and this additional space is used to add slices 510 to the upper-deck file system 400. As indicated, the volume file 410 has a maximum size shown as Max(VF). If demand by the upper-deck file system 400 surpasses this value, then subsequent file write operations from a host to the upper-deck file system 400 may be responded to with an out-of-space condition. In one embodiment, this may always occur. In another embodiment, this may be prevented by increasing Max(VF) and allocating additional storage from the pool 232 if available.

Figure 7:
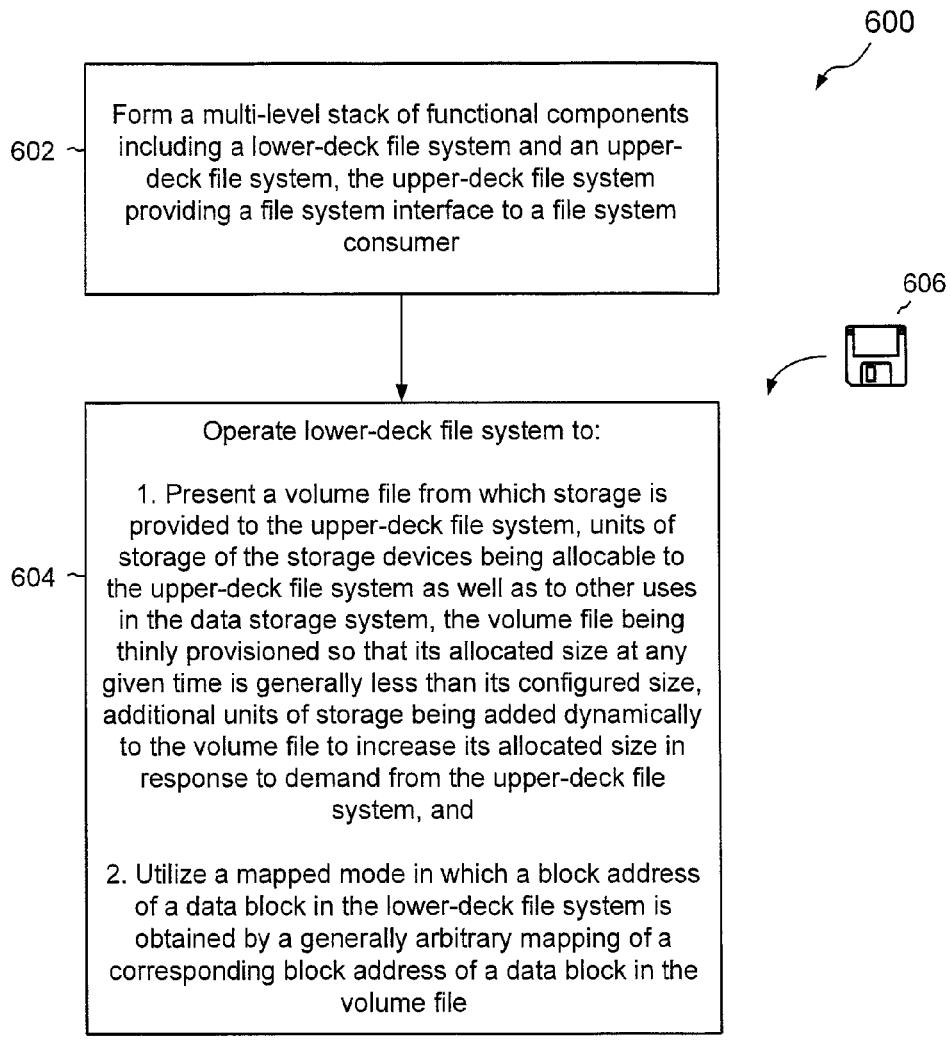
FIG. 7 is a flow diagram of operation of a lower-deck file system.

FIG. 7 is a high-level flow diagram of pertinent operation 600 of the data storage system 116. At 602, software is instantiated in the SP 120 to form a multi-level stack of functional components including a lower-deck file system 406 and an upper-deck file system 400. The upper-deck file system 400 provides a file system interface to a file system consumer (e.g., a host computer).

At 604 are operations of the lower-deck file system 406, which include: (i) presenting a volume file 410 from which storage is provided to the upper-deck file system 400. Units of storage of the physical storage 180 are available for other uses by the data storage system. That is, the units (e.g. slices) are not reserved for use by the upper-deck file system 400. The volume file 410 is thinly provisioned so that its allocated size at any given time is generally less than its configured size. Additional units of storage are added dynamically to the volume file 410 to increase its allocated size in response to demand from the upper-deck file system 400. Operations of the lower-deck file system 406 also include (ii) utilizing a mapped mode of operation in which a block address of a data block in the lower-deck file system is obtained by a generally arbitrary mapping (e.g., Inode/IB traversal) of a corresponding block address of the data block in the volume file.

As shown, the operating software may be stored on and instantiated from a non-transitory computer-readable medium 606 such as a magnetic or optical disk or nonvolatile semiconductor memory such as Flash.

Figure 8:
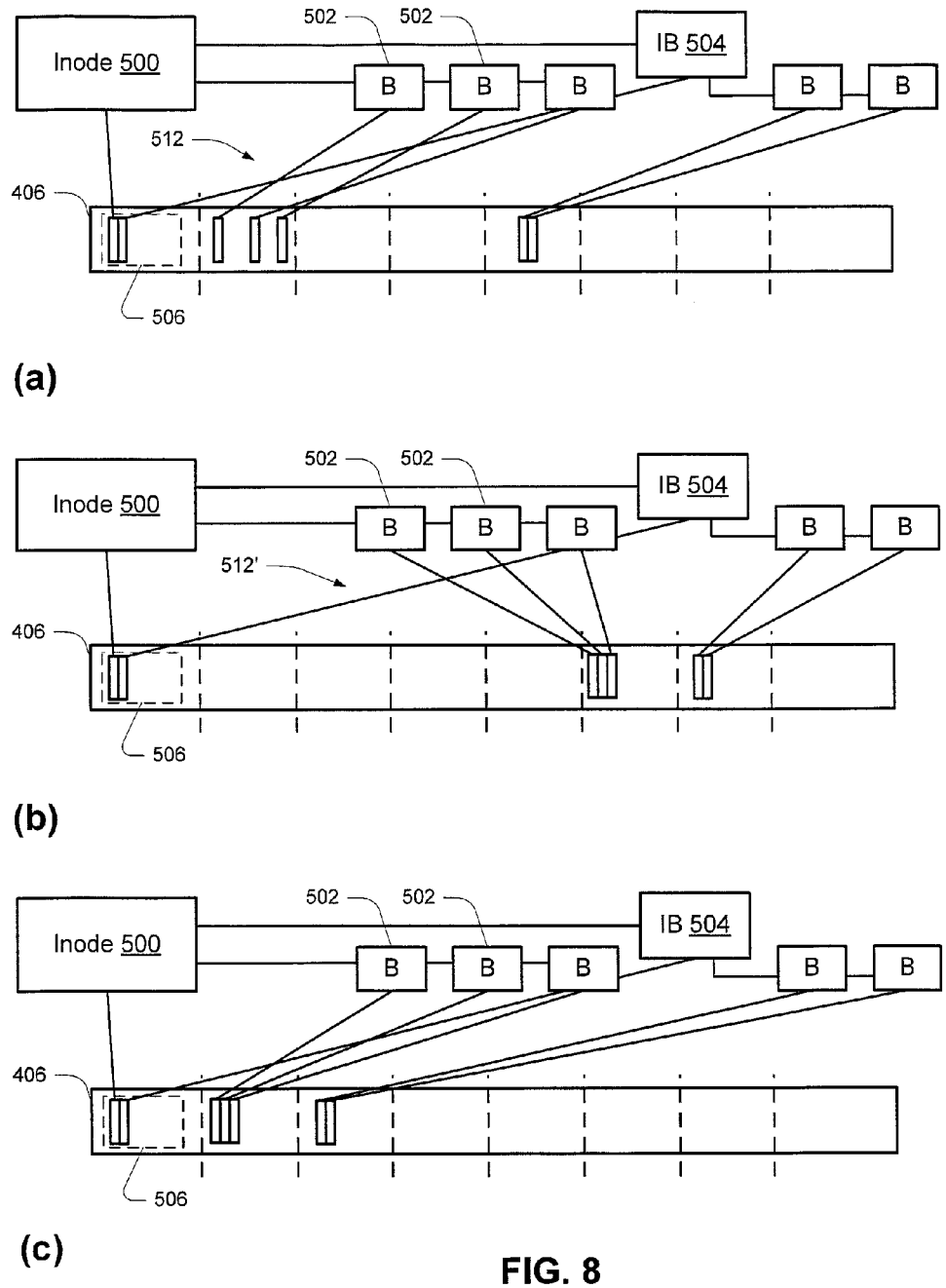
FIG. 8, having parts (a), (b) and (c), is a set of schematic diagram depicting a transition of operating modes of a lower-deck file system.

FIG. 8 illustrates the above-mentioned transition of the lower-deck file system 406 from a mapped mode of operation to a direct mode of operation. Part (a) of FIG. 8 shows the mapped mode, the same as described above with reference to FIG. 5. Part (b) shows an intermediate or transitional stage occurring as part of a defragmentation operation used in transitioning to direct mode. The blocks 502 are still mapped, by a transitional mapping 512', but they have been moved and re-ordered in other locations that can be calculated based on location in the volume file 410 rather than requiring IB tree traversal. Part (c) shows the final direct operating mode. In this case, the blocks as defragmented (part (b)) have been moved back down to a lower part of the file system space, as is typically done in defragmentation, but in general this is not required.

The respective organizations in the transitional stage (b) and the final condition (c) may differ only by an offset value that represents an offset between the respective overall locations of the data blocks. In the simplified example of FIG. 8, this offset is four slices, i.e., the set of data blocks is moved down four slices from the transitional location of (b) to the final location of (c). Thus while the transitional mapping 512' is being used, the block locations are also given by the same calculation that will be used when direct-mode operation begins, with the addition of the offset value to account for the offset. Another way of viewing this is that the transitional stage (b) establishes a calculation that can be used (but is not yet used, as mapped mode continues), and this calculation need by modified only by subtracting the offset value to arrive at the actual calculation that is used once direct mode commences.

Regarding the above-mentioned calculation, in one embodiment the on-disk location of any data block in a file 410 is simply the starting location of all data blocks in the file system plus the offset of the data block in the file 410. A slightly more complex calculation can be used when metadata is interspersed with the data blocks according to some known predetermined pattern.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the lower-deck file systems 230 have been described as storing file representations of LUNs, host file systems, block-based vVols, file-based vVols, and snaps of any of the foregoing. These are merely examples, however. Other types of objects may be stored in the lower-deck file systems 230 as file representations, such as virtual hard disks (VHDs), virtual machine disks (VMDKs), internal file systems used by the data storage apparatus 116, and internal volumes, for example.

In addition, as shown and described, different types of objects (LUNs, host file systems, etc.) are shown and described as being stored in respective lower-deck file systems. This is merely an example, however. Alternatively, any of LUNs, host file systems, block-based vVols, and file-based vVols, as well as snaps of any of the foregoing, may be included together in a single lower-deck file system or in any number of lower-deck file systems. Thus, it is not required that files representing different types of objects be stored in different lower-deck file systems.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1150 in FIG. 12). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A data storage system for use by a file system consumer according to a file system interface, comprising:
   one or more physical nonvolatile storage devices; and
   a processing subsystem executing software to form a multi-level stack of functional components including a lower-deck file system and an upper-deck file system, the upper-deck file system providing the file system interface to the file system consumer, the lower-deck file system presenting a volume file from which storage is provided to the upper-deck file system, units of storage of the storage devices being allocable to the upper-deck file system as well as to other uses in the data storage system, the volume file being thinly provisioned so that its allocated size at any given time is less than its configured size, additional units of storage being added dynamically to the volume file to increase its allocated size in response to demand from the upper-deck file system, the lower-deck file system operating in a mapped mode in which a block address of a data block in the lower-deck file system is obtained by a mapping of a corresponding block address of a data block in the volume file,
   wherein the lower-deck file system is operative to transition between the mapped mode and the direct mode of operating by (i) during operation in the mapped mode, reorganizing the locations and ordering of the data blocks in a transitional location so that their block addresses can be obtained by the predetermined mathematical calculation with addition of an offset value representing an offset between the transitional location and a final location, and (ii) in an atomic action, moving the data blocks to the final location and beginning the direct mode of operating with use of the predetermined mathematical calculation.

2. A data storage system according to claim 1, wherein the mapping includes traversal of pointers and indirect blocks of an inode structure identifying locations of data blocks in the lower-deck file system based on block addresses of the data blocks in the volume file.

3. A data storage system according to claim 1, wherein the volume file has a maximum size, and wherein, upon the allocated size of the volume file becoming equal to the maximum size, an out-of-space response is returned to the file system consumer.

4. A data storage system according to claim 1, wherein the volume file is a sparse volume for which the allocated size is less than one-half its configured size.

5. A data storage system according to claim 1, wherein the units of storage are slices having a slice size at least ten times a block size of the data blocks.

6. A data storage system according to claim 5, wherein the slices are pool slices and the slice size is a pool slice size, and wherein the volume file is consumed by the upper-deck file system in upper slices having an upper slice size.

7. A data storage system according to claim 6, wherein the upper slice size is equal to the pool slice size and the upper slices are aligned with the pool slices.

8. A data storage system according to claim 6, wherein the upper slice size is not equal to the pool slice size.

9. A data storage system according to claim 1, wherein the mapped mode of operation of the lower-deck file system includes deduplication functionality by which duplicate blocks in a deduplication domain including the upper-deck file system are stored as a single shared block and corresponding block pointers in the lower-deck file system.

10. A data storage system according to claim 1, wherein the lower-deck file system can also be operated in a direct mode in which a block address of a data block in the lower-deck file system is obtained by a predetermined mathematical calculation from a corresponding block address of the data block in the volume file.

11. A data storage system according to claim 1, wherein the transition between the mapped mode and the direct mode occurs as part of a defragmentation operation.

12. A method of operating a data storage system to provide file system functionality to a file system consumer according to a file system interface, the data storage system including one or more physical nonvolatile storage devices and a processing subsystem, comprising:
   instantiating, in the processing subsystem, software to form a multi-level stack of functional components including a lower-deck file system and an upper-deck file system, the upper-deck file system providing the file system interface to the file system consumer; and
   by the lower-deck file system, (i) presenting a volume file from which storage is provided to the upper-deck file system, units of storage of the storage devices being allocable to the upper-deck file system as well as to other uses in the data storage system, the volume file being thinly provisioned so that its allocated size at any given time is less than its configured size, (ii) dynamically adding additional units of storage to the volume file to increase its allocated size in response to demand from the upper-deck file system, and (iii) utilizing a mapped operating mode in which a block address of a data block in the lower-deck file system is obtained by a mapping of a corresponding block address of a data block in the volume file,
   wherein the lower-deck file system is operative to transition between the mapped mode and the direct mode of operating by (i) during operation in the mapped mode, reorganizing the locations and ordering of the data blocks in a transitional location so that their block addresses can be obtained by the predetermined mathematical calculation with addition of an offset value representing an offset between the transitional location and a final location, and (ii) in an atomic action, moving the data blocks to the final location and beginning the direct mode of operating with use of the predetermined mathematical calculation.

13. A method according to claim 12, wherein the mapping includes traversal of pointers and indirect blocks of an inode structure identifying locations of data blocks in the lower-deck file system based on block addresses of the data blocks in the volume file.

14. A method according to claim 12, wherein the volume file has a maximum size, and wherein, upon the allocated size of the volume file becoming equal to the maximum size, an out-of-space response is returned to the file system consumer.

15. A method according to claim 12, wherein the volume file is a sparse volume for which the allocated size is less than one-half its configured size.

16. A method according to claim 12, wherein the units of storage are slices having a slice size at least ten times a block size of the data blocks.

17. A method according to claim 16, wherein the slices are pool slices and the slice size is a pool slice size, and wherein the volume file is consumed by the upper-deck file system in upper slices having an upper slice size.

18. A method according to claim 17, wherein the upper slice size is equal to the pool slice size and the upper slices are aligned with the pool slices.

19. A method according to claim 17, wherein the upper slice size is not equal to the pool slice size.

20. A method according to claim 12, wherein the mapped mode of operation of the lower-deck file system includes deduplication functionality by which duplicate blocks in a deduplication domain including the upper-deck file system are stored as a single shared block and corresponding block pointers in the lower deck file system.

21. A method according to claim 12, wherein the lower-deck file system can also be operated in a direct mode in which a block address of a data block in the lower-deck file system is obtained by a predetermined mathematical calculation from a corresponding block address of the data block in the volume file.

22. A method according to claim 12, wherein the transition between the mapped mode and the direct mode occurs as part of a defragmentation operation.

* * * * *